United States Patent
Hartmann et al.

(10) Patent No.: US 6,959,896 B2
(45) Date of Patent: Nov. 1, 2005

(54) PASSIVE AERODYNAMIC SONIC BOOM SUPPRESSION FOR SUPERSONIC AIRCRAFT

(75) Inventors: Tom Hartmann, Canyon Country, CA (US); John M. Morgenstern, Lancaster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/614,393

(22) Filed: Jul. 3, 2003

(65) Prior Publication Data

US 2004/0065774 A1 Apr. 8, 2004
US 2004/0245380 A9 Apr. 8, 2004

Related U.S. Application Data

(63) Continuation-in-part of application No. 10/006,505, filed on Dec. 6, 2001, now Pat. No. 6,729,577, and a continuation-in-part of application No. 09/499,654, filed on Feb. 28, 2000, now Pat. No. 6,588,703.

(51) Int. Cl.[7] .............................................. B64C 30/00
(52) U.S. Cl. .................................... 244/35 A; 244/45 R
(58) Field of Search .......................... 244/54, 55, 1 N, 244/34 A, 35 R, 36, 119, 15, 35 A, 53 B, 210, 130

(56) References Cited

U.S. PATENT DOCUMENTS

| | | | | |
|---|---|---|---|---|
| 3,794,274 A | * | 2/1974 | Eknes | 244/130 |
| 4,072,282 A | * | 2/1978 | Fulker et al. | 244/35 R |
| D263,135 S | * | 2/1982 | Friebel et al. | D12/341 |
| 4,582,276 A | * | 4/1986 | Gerhardt | 244/119 |
| 5,740,984 A | * | 4/1998 | Morgenstern | 244/1 N |
| D417,184 S | * | 11/1999 | Hartmann et al. | D12/333 |

* cited by examiner

Primary Examiner—Peter M. Poon
Assistant Examiner—T. D. Collins
(74) Attorney, Agent, or Firm—Koestner Bertani LLP (57) ABSTRACT

An aircraft capable of supersonic flight comprises a body portion including a fuselage, a wing, and an engine nacelle mounted below the wing. The aircraft may also include a high-mounted aft, tail. The area/lift distribution of the body portion is tailored to reduce sonic boom disturbance. The body portion further includes a blunt nose and a gull dihedral wing configuration that further reduces sonic boom disturbance and eases constraints on area/lift distribution tailoring. The gull dihedral wing or tail is configured to carry lifting force to its trailing edge to create an expansion at the aft end of the aircraft that reduces aft sonic boom ground shock strength. The volume of the mid-portion of the fuselage can be reduced above the wing to create a sloped surface that generates an expansion fan over the wings. The expansion fan lowers the pressure above the wing in the area covered by the expansion to reduce the pressure required on the upper and lower surfaces of the wing to generate the same lifting force.

16 Claims, 13 Drawing Sheets

Trailing Edge (TE)

PASSIVE AERODYNAMIC SONIC BOOM SUPPRESSION FOR SUPERSONIC AIRCRAFT

CROSS-REFERENCE TO RELATED APPLICATION

This application is a continuation-in-part of U.S. Ser. No. 09/499,654 filed Feb. 8, 2000, now U.S. Pat. No. 6,588,703 entitled "Passive Aerodynamic Sonic Boom Suppression for Supersonic Aircraft", issued Jul. 8, 2003 and is a continuation-in-part of U.S. Ser. No. 10/006,505 filed Dec. 6, 2001, now U.S. Pat. No. 6,729,577.

BACKGROUND

1. Field of Invention

The present invention relates generally to high-speed aircraft, and more particularly to long range supersonic cruise aircraft having sonic boom shock suppression capabilities.

2. Description of the Related Art

When an object such as an airplane travels through air, the movement of the plane causes a pressure disturbance that moves at the speed of sound. By way of example, the sound waves created by the nose of the plane will travel in an outward direction away from the aircraft. The air ahead of the plane receives the sound waves before the arrival of the aircraft, so that when the aircraft arrives, the air flows around the plane. As the airplane approaches the speed of sound, the sound waves merge closer and closer together at the front of the plane. When the aircraft is moving at the speed of sound the sound waves merge together into a "shock wave" which is an almost instantaneous line of change in pressure, temperature and density.

Figure 1:
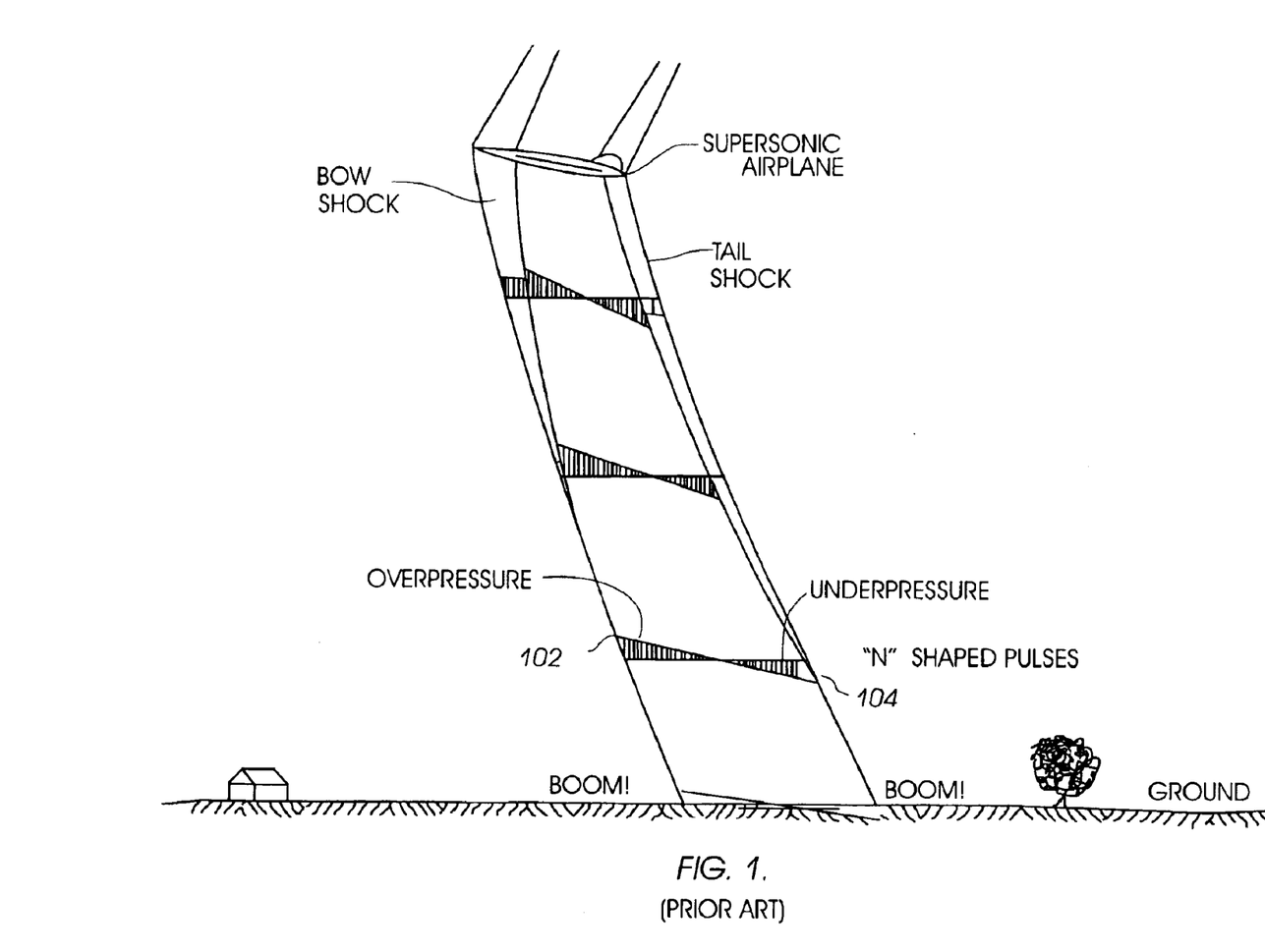
FIG. 1 is an illustration of shock waves created when an aircraft travels faster than the speed of sound.

As shown in FIG. 1, an aircraft traveling at supersonic speed will generate a bow shock wave from the nose of the airplane and a tail shock wave created by the tail of the plane. The tail shock wave is created by an under pressurization in the air about the tail. The overall shock wave pressure gradient extends from an over-pressure area beneath the forward portion of the plane and an under-pressure area beneath the aft section of the aircraft, as shown in FIG. 1. Pressure disturbances coalesce into an N-wave shape that has the largest shock magnitudes at the inflection points 102, 104 of the pressure gradient curve. Since the front of a supersonic aircraft generates an increase in ambient pressure, and the rear generates a decrease in pressure, a corresponding variation in propagation speed causes aircraft pressure disturbances to stretch out as they propagate to the ground. As the disturbances stretch out, they also tend to coalesce because shocks waves travel only halfway between the speed of the lower pressure ahead and higher pressure behind.

The shock waves travel through the atmosphere to the ground. To an observer, the shock waves are felt as an abrupt pressure compression, followed by a gradual pressure decompression and a final abrupt recompression to ambient pressure. The abrupt change in pressure can create a disturbingly loud sound. Additionally, the shock waves may cause structural damage to surrounding buildings. For these reasons supersonic transports (SST) have been limited to routes that do not carry the plane across land. SSTs are therefore restricted to flights across water, thereby limiting the usefulness of the planes. It is desirable to reduce the effects of sonic shock waves created by supersonic aircraft.

SUMMARY

In one embodiment, an aircraft capable of supersonic flight comprises a body portion including a fuselage, a wing, and an engine nacelle mounted below the wing. The fuselage and wing are configured with a tailored area/lift distribution including a blunt nose and a gull dihedral wing configuration to reduce sonic boom disturbance. The gull dihedral wing is configured to carry lifting force at the trailing edge of the wing to create an expansion at the trailing edge of the wing that reduces aft sonic boom shock.

In another embodiment, an aircraft capable of supersonic flight comprises a body portion including a blunt nose, a fuselage, a wing, and an engine nacelle mounted below the wing. The area/lift distribution of the body portion is tailored to reduce sonic boom disturbance. The volume of the mid-fuselage portion is reduced above the wing to generate an airflow expansion on a sloped portion of the mid-fiselage to lower the pressure above the wing in the area covered by the expansion.

DETAILED DESCRIPTION OF THE INVENTION

The following description is provided to enable any person skilled in the art to make and use various embodiments of the invention, and sets forth the best modes contemplated by the inventor of carrying out the various embodiments disclosed.

Various embodiments disclosed herein use a combination of synergistic techniques to achieve reduction of the sonic boom from supersonic airplanes. A reduction of noise from sonic booms by at least 15–25 decibels is achieved while reducing the drag of a reduced boom vehicle and maintaining a practical design.

FIGS. 2A through 2D illustrate an embodiment of an aircraft 200 configured to minimize sonic boom disturbances. Aircraft 200 includes features that compress the pressure at the nose, expand pressure at the tail, and constrain the pressures between the nose and tail to weak compressions and expansions to prevent the pressure waves from coalescing. As a result, aircraft 200 can fly at supersonic speeds with significantly reduced sonic boom disturbances, as further described herein.

Area and Lift Distribution Tailoring to Minimize Sonic Boom

In a technical paper entitled "Sonic-Boom Minimization" published in the Journal of the Acoustical Society of America, Vol. 51, No. 2, Pt. 3, Feb. 1972, pp. 686–694, the authors A. R. George and Richard Seebass developed the theory for tailoring the area and lift distribution versus aircraft length to minimize the shock strength at the ground given parameters of aircraft weight, flight altitude and Mach number. To minimize the shock strength, the sum of the area and lift must exactly follow the George and Seebass distribution. Minimizing shock strength In "Sonic-Boom Minimization with Nose Bluntness Relaxation," published as NASA TP-1348, 1979, Darden added a shape for a relaxed bluntness nose that reduced bluntness drag greatly with a slight increase in boom.

Aircraft configured according to George-Seebass-Darden's theory for shock minimized distributions are impractical designs because the distributions require:

1. either blunt noses or relaxed bluntness noses whose shapes result in higher drag than minimum drag shapes, which lead to reduced performance;
2. smooth distributions through the engine nacelle region, which is not possible with existing engine designs;
3. a one-dimensional simplifying assumption so the distributions are only calculated directly under the vehicle, which means that non-planar and azimuthally varying effects are not considered; and
4. an expansion behind the aft end of the vehicle to keep the aft shock from coalescing, contrary to a minimum wave drag shape which compresses the flow field for about the last quarter of the vehicle's length.

Additional techniques are therefore desired to suppress all shock sources of a realistic vehicle.

Achieving a minimized equivalent area distribution is difficult because so many other vehicle requirements are impacted anytime the area or lift distributions are changed. It is extremely computationally intensive to arrive at a design that meets all the constraints and requirements with optimum performance. A more feasible low boom design capability is possible by using a more flexible sonic boom minimization constraint. The following extensions to sonic boom minimization theory help achieve the desired flexibility in the sonic boom minimization constraint, with the result of arriving at feasible supersonic aircraft designs with optimum performance more quickly than previously possible.

The zero-lift wave drag on aircraft 200 is proportional to the sum of the second derivative of cross-sectional area and the square of the maximum cross-sectional area of all components of aircraft 200. To reduce the wave drag due to the second derivative of cross-sectional area, the area must follow a smooth bell curve shape known as a Sears-Haack body. A smooth overall vehicle cross-sectional area in the vicinity of wing 208 is more significant in reducing wave drag than a smooth fuselage 212 area. Wave drag is reduced when changes in cross-sectional area, and the maximum cross-sectional area, are minimized. To reduce second derivative variations and the maximum cross-sectional area, the volume of fuselage 212 is reduced in the vicinity of wing 208 and tail 214, so that there are no discontinuities in the cross-sectional area distribution of the overall aircraft 200.

Figures 2A, 2B, 2C:
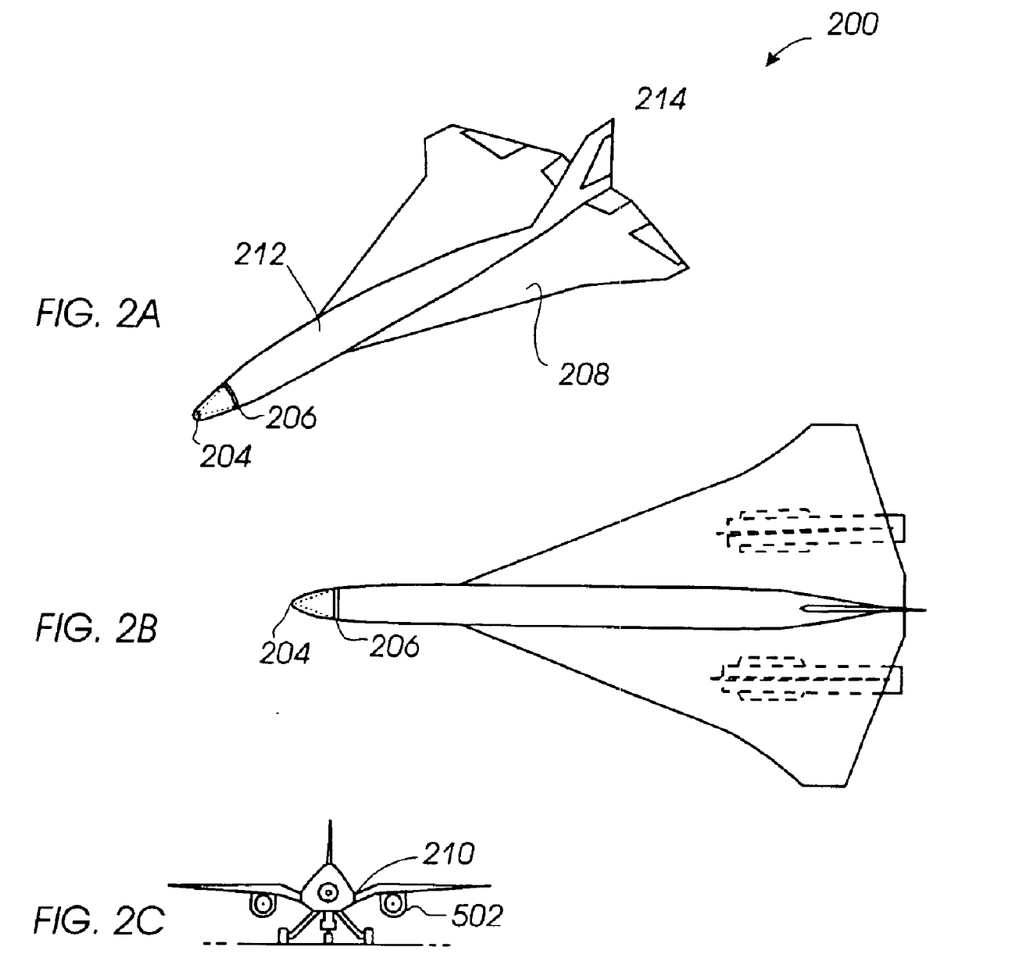
FIGS. 2A through 2D illustrate an embodiment of an aircraft configured with various features to minimize sonic boom disturbances.
Figure 2D:
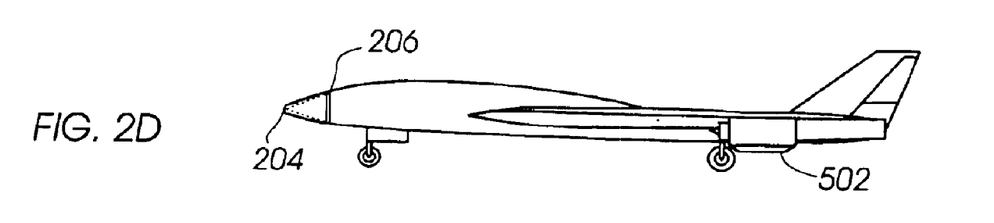
Figure 2E:
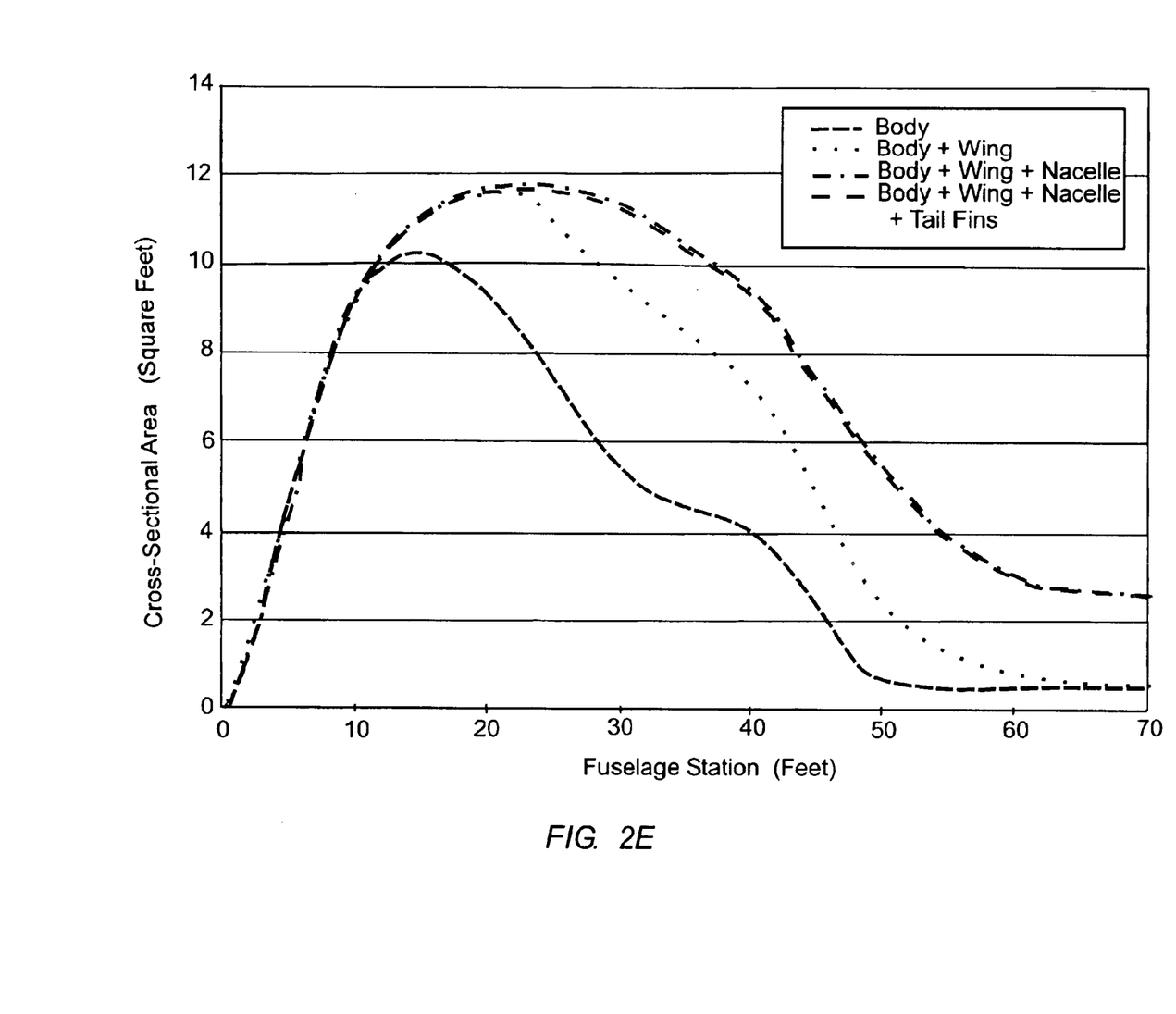
FIG. 2E shows the difference in cross-sectional area for a conventionally-shaped aircraft body versus an aircraft body configured according to the Sears-Haack conceptual body shape to yield the lowest possible wave drag for a given length and volume.

FIG. 2E shows the difference in cross-sectional area for a conventionally-shaped aircraft body 230 versus an aircraft body 240 configured according to the Sears-Haack conceptual body shape to yield the lowest possible wave drag for a given length and volume. The variation in cross-sectional area for aircraft body 240 minimizes wave drag when the curvature of the overall vehicle cross-sectional area distribution is minimized. The closer the cross-sectional areadistribution of an aircraft or other high-speed vehicle comes to the ideal Sears-Haack body shown in FIG. 2F, the lower the wave drag.

Artificially Blunt Leading Edges (ABLE)

Figure 3A:
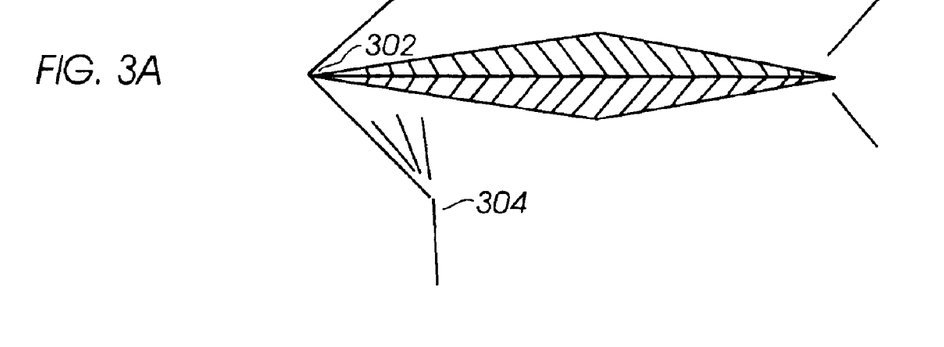
FIGS. 3A and 3B illustrate leading edge configurations and resultant shock formations.
Figure 3B:
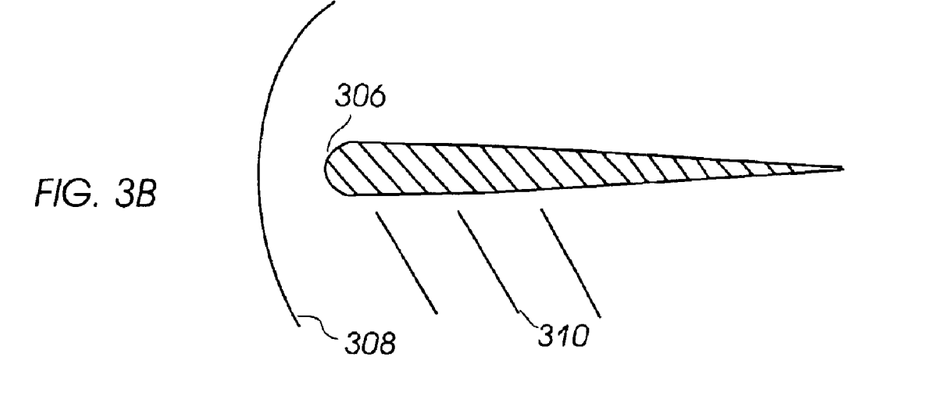
Figure 3C:
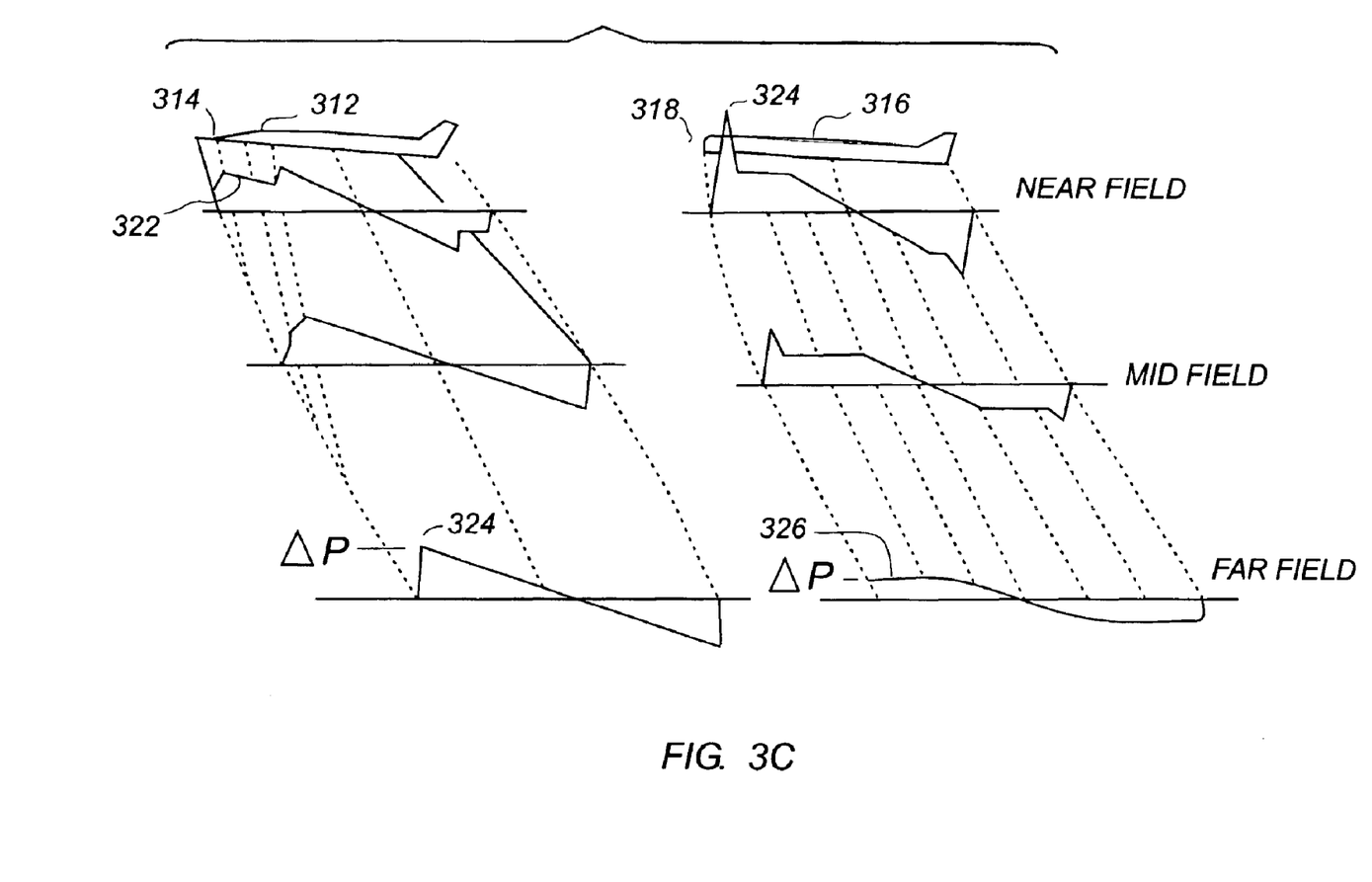
FIG. 3C illustrates leading edge configurations and resultant shock formations.

Referring now to FIGS. 2A through 2D, and 3A through 3F, Sharp leading edges 302 on an aircraft generate strong compressions 304 as indicated in FIG. 3A that coalesce to produce a strong far-field overpressure. A blunt leading edge 306 creates a strong bow shock 308 as indicated in FIG. 3B, but subsequent compressions 310 are weak and less likely to coalesce. In addition, the dissipation with altitude of strong initial shocks is greater. High wave drag of blunt edges or noses has traditionally precluded practical applications, and has been described as the "low boom, high drag" paradox. FIG. 3C shows diagrams comparing near-field, mid-field, and far-field pressure wave signatures of aircraft 312 configured with a sharp nose 314, and aircraft 318 with a blunt nose 320. While near-field pressure wave signature 322 at nose 314 of aircraft 312 is smaller in magnitude, the pressure waves coalesce to produce a strong far-field pressure wave. In contrast, although blunt-nose 318 of aircraft 316 causes a large spike in the near-field pressure wave signature 324, the far-field pressure wave signature 326 is greatly reduced compared to the far-field pressure wave signature of aircraft 312.

Figure 3D:
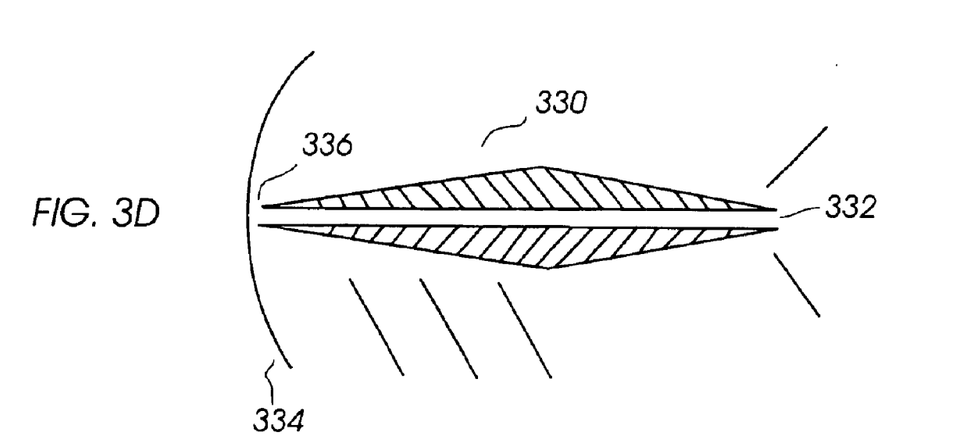
FIG. 3D shows a leading edge configuration with channels and resultant shock formations.

To address this phenomenon, "slotted edge" technology can be used to significantly reduce drag associated with blunt-nose/blunt-edges, as well as far-field overpressure of leading edge shocks. A cross-sectional diagram of an embodiment of a slotted airfoil 330 is shown in FIG. 3D. When flow becomes choked in channel 332, a strong normal shock 334 is induced in front of leading edge 336. The pressure and friction drag of the resultant flow pattern of slotted airfoil 330 is significantly lower than conventional airfoil leading edge 306 (FIG. 3B). Computational Fluid Dynamics analysis has shown up to 40% reduction in drag relative to an equivalent blunt airfoil.

Figure 3E:
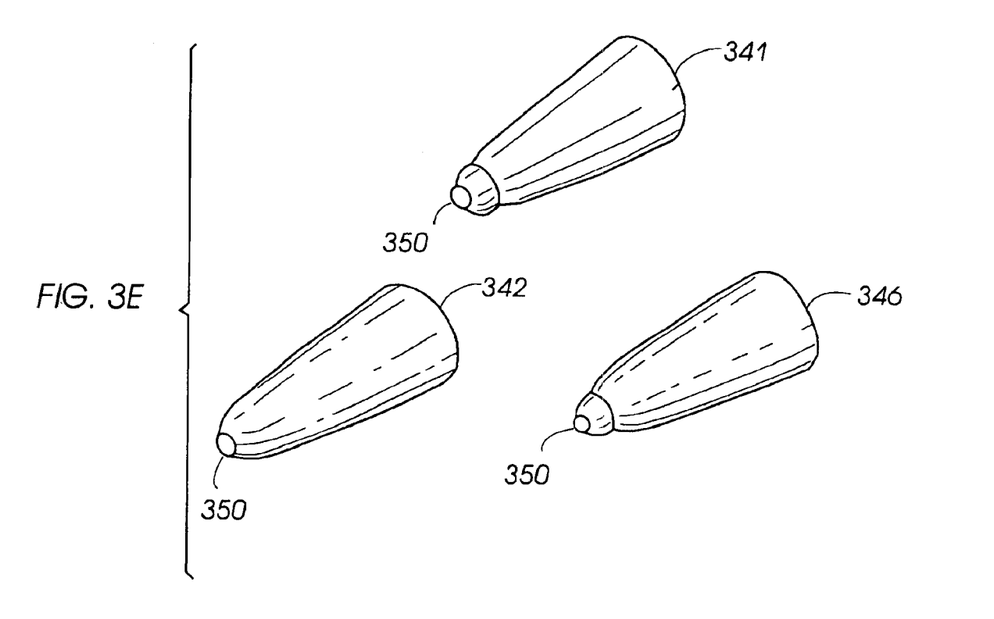
FIGS. 3E and 3F illustrate multiple Artificially Blunt Leading Edge (ABLE) nose figurations designed for a representative low boom tailored aircraft.
Figure 3F:
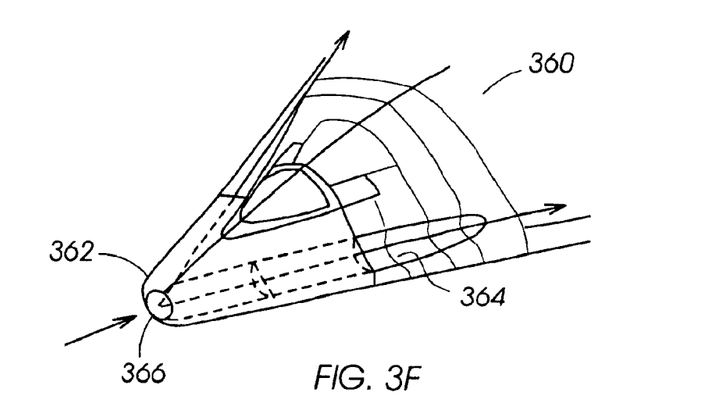

Another method of incorporating slotted edge technology on aircraft 200 includes attaching one of blunt noses 342, 344, 346 to aircraft 200, as shown in FIG. 3E. A normal shock inlet 350 is placed at tip of noses 342, 344, 346 to generate a strong shock with less drag because the flow enters inlet 350 and finds an outlet through slots 206 (FIG. 2A) instead of stagnating, as occurs with conventional blunt nose aircraft. Noses 342, 344, 346 can be fastened to aircraft 200 in any suitable manner. As a result, blunt noses 342, 344, 348 with inlet 350 have lower drag while providing the bluntness desired in a tailored body distribution to minimize the rate of change of differences in cross-sectional area of aircraft 200. FIG. 3F shows an embodiment of aircraft 360 with a flying wing configuration that incorporates blunt nose 362 and channels 364 to provide an outlet for flow through inlet 366.

Shock Cancellation

Figure 4:
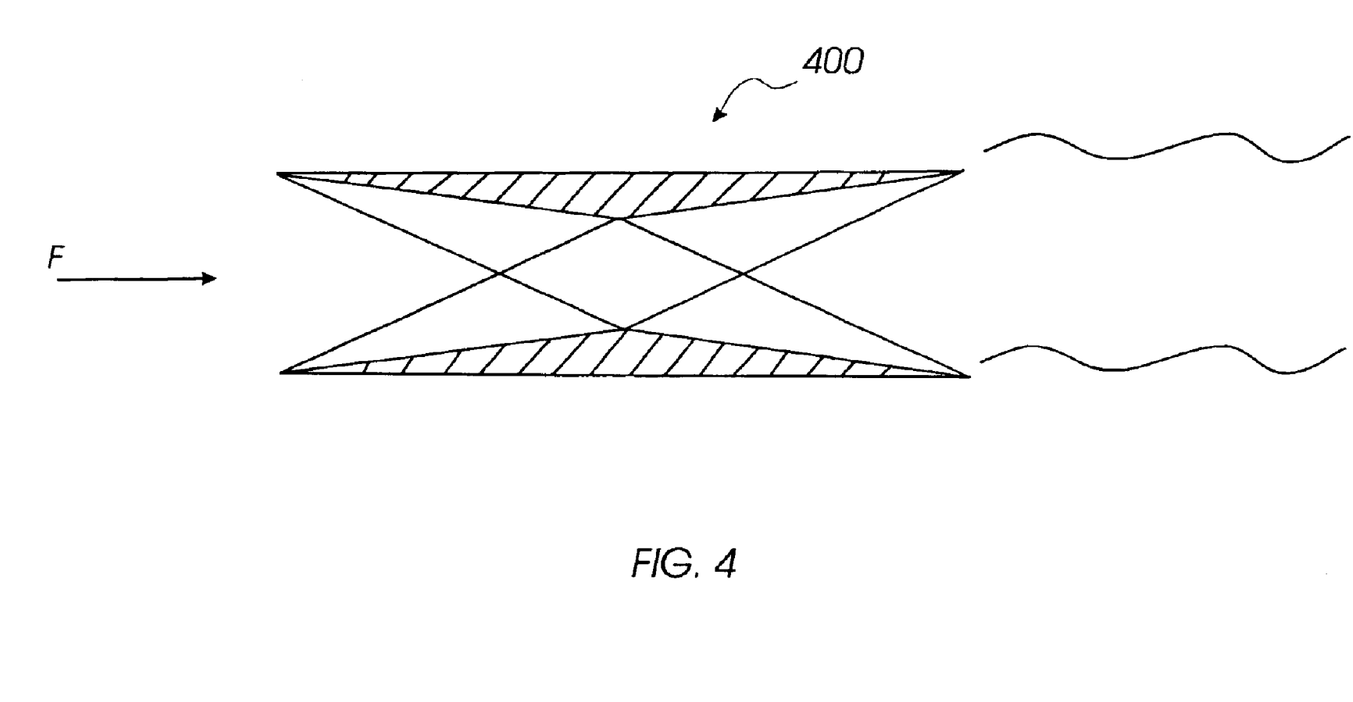
FIG. 4 is a diagram of shock wave cancellation between two parallel plates.

Referring now to FIG. 4, there is shown a two-dimensional shock-free environment, corresponding to a model developed by Busemann in 1935, comprising a bi-planar structure 400 exhibiting parallel surfaces. Busemann's study helped explain how a shock-free environment of parallel surfaces leads to theoretically zero wave drag (due to volume) through shock cancellation. With the Busemann biplane structure 400 at zero incidence, as shown in FIG. 4, shocks produced at the leading edges are canceled by expansions at the shoulders of the opposite surfaces. The expansion waves are then canceled by shocks at the trailing edges. The result is low wave drag, no sonic boom, and no lift. As the incidence angle is increased in order to produce lift, an undesirable shock is produced off the lower surface. The Busemann bi-planar structure 400 is therefore impractical for a lift producing "Low Boom" supersonic aircraft. However, the Busemann structure 400 can be incorporated on the aircraft to cancel shocks off "non-lift producing" structure such as engine nacelles.

Figure 5A:
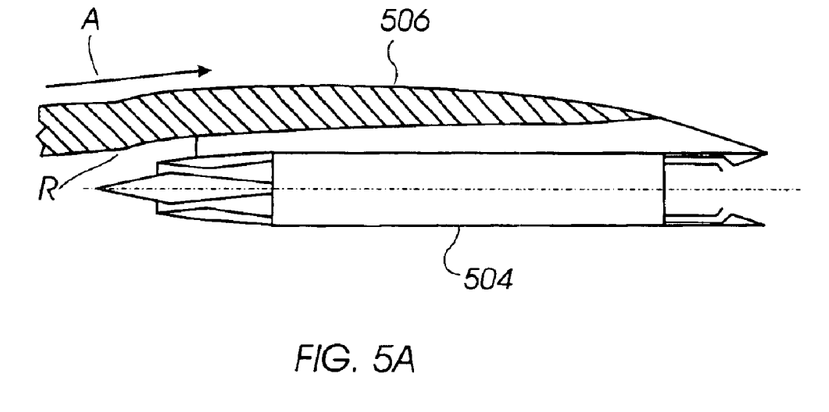
FIGS. 5A through 5C illustrate an embodiment of an engine mounted beneath a reflexed aircraft wing to reduce sonic boom disturbances.
Figure 5B:
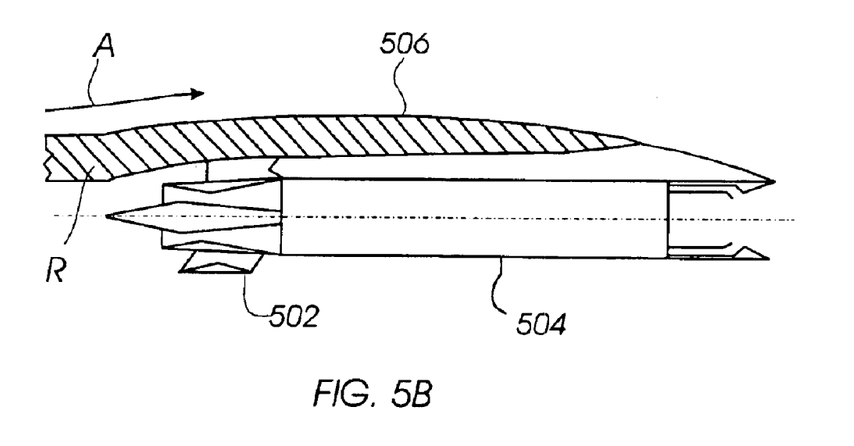
Figure 5C:
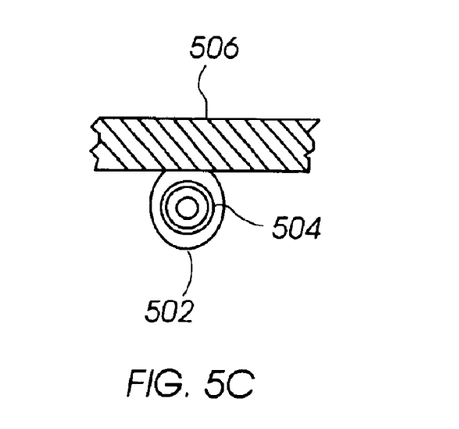

Referring now to FIGS. 5A through 5C, shock cancellation shroud 502 is incorporated around the engine nacelles 504 with trailing edge portion of wing 506 incorporating a reflexed portion R above engine nacelle 504. Reflexed portion R of wing 506 includes an upward bend in both the lower and upper surfaces of wing 506. FIGS. 5A and 5B show a cross-section of a trailing edge portion of wing 506 along the aircraft longitudinal axis. The inlet of engine nacelle 504 is mounted below wing 506 and slightly aft of reflexed portion R of wing 506. Arrow A indicates the direction of air flow over wing 506. FIG. 5B shows a cross-section of an embodiment of shock cancellation shroud 502 that extends around only a front portion of nacelle 504. FIG. 5C shows a front view of shock cancellation shroud 502 around engine nacelle 504 below wing 506. During supersonic flight, expansions at the leading edge of shock cancellation shroud 502 cancel shock wave expansions generated at nacelle inlet 508. The dimensions of shock cancellation shroud can be selected to optimally cancel expansions from nacelle 504.

The reflexed portion R of wing 506 beyond the minimum drag amount to further reduce the nacelle shock can be of further benefit for area/lift tailoring. For lifting surfaces, such as wing 506, the surface loading is reoptimized for minimum drag in the presence of the impinging pressures from shock waves from the upper portion of nacelle 504, resulting in a slight (generally 6%) increase in loading where compressions increase the local lifting efficiency (due to the higher lift curve slope in the locally lower Mach number). Minimum drag is achieved with one-hundred percent impingement induced load cancellation, which can be achieved by proper positioning of reflexed portion R of wing 506 with respect to engine nacelle 504.

Figure 6:
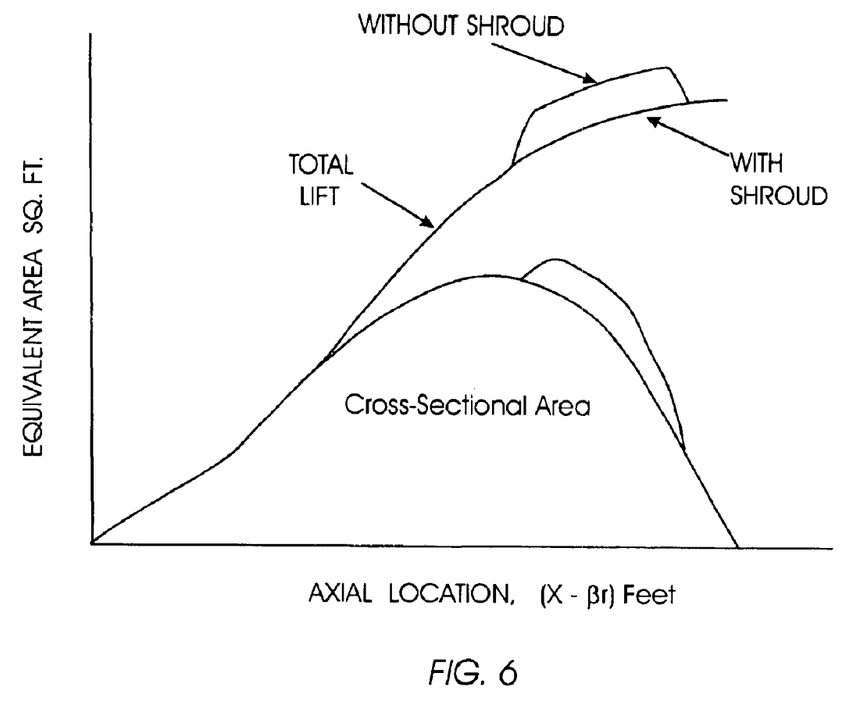
FIG. 6 is a graph showing equivalent area distribution with and without an engine nacelle shock cancellation shroud for sonic boom shock reduction.
Figure 7:
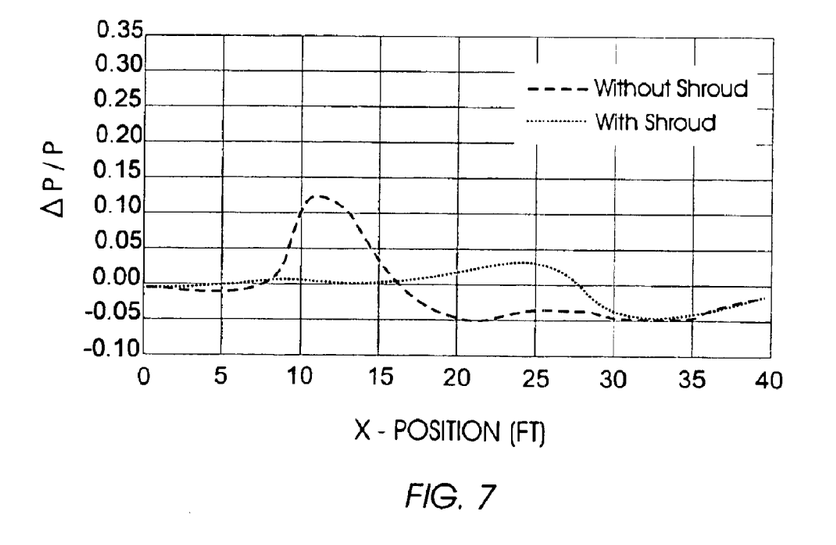
FIG. 7 is a graph showing change in pressure versus aircraft fuselage station for aircraft with and without an engine nacelle shock cancellation shroud for sonic boom shock reduction.

Referring to FIGS. 5B and 6, FIG. 6 shows equivalent area of aircraft 200 (FIG. 2C) with and without shock cancellation shrouds 502 and wing-body tailoring. The rate of change of equivalent area shows a discontinuity at the location of engine nacelles 504, however, shock cancellation shrouds 502 substantially reduce the discontinuity in the tailored area/lift distribution. FIG. 7 shows pressure distributions with and without shock cancellation shroud 502. Shock strength is greatly reduced and the shock location moves farther aft with shock cancellation shroud 502 and reflexed wing 506 (FIG. 5B), compared to nacelle 504 without shock cancellation shroud 502 or wing-body tailoring.

Non-Planar Shock Directionality

For heavier vehicles and higher flight altitudes, the equivalent area due to lift becomes much greater than the area due to vehicle volume. It becomes important to spread-out and properly distribute lift to the meet sonic boom minimization and trim requirements. Three non-planar techniques disclosed herein are:

1. azimuthal redistribution to decrease sonic boom propagating below the vehicle by redirecting it to the sides or above the vehicle;
2. increasing the effective length that can be used for sonic boom minimization by increasing the height of lifting surfaces toward the aft end of the vehicle;
3. extending or adding a lifting surface at the aft end of the vehicle's effective length to create the expansion spike required for sonic boom minimization.

For non-planar technique one, aircraft 200 further incorporates a different area distribution for azimuths above the wing than below, creating lift without the associated sonic boom disturbance below the vehicle. The side view of aircraft 200 in FIG. 2D shows that the volume of fuselage 212 is reduced to a greater extent above wing 208 than below wing 208. This greater reduction in fuselage 212 volume above the wing results in a reduction in pressure $E_1$ shown in FIG. 9A and 9B that increases the lift on the upper surface of wing 208. Consequently, the lift needed from higher pressure under wing 208 can be reduced by reducing the angle-of-attack. George-Seebass minimization shows that the reduction in higher pressure under the wing reduces sonic boom shock strength proportionately. The top plan view of aircraft 200 in FIG. 2B shows that, while the height of fuselage 212 has been flattened, the width can still accommodate the landing gear tires.

Figure 9A:
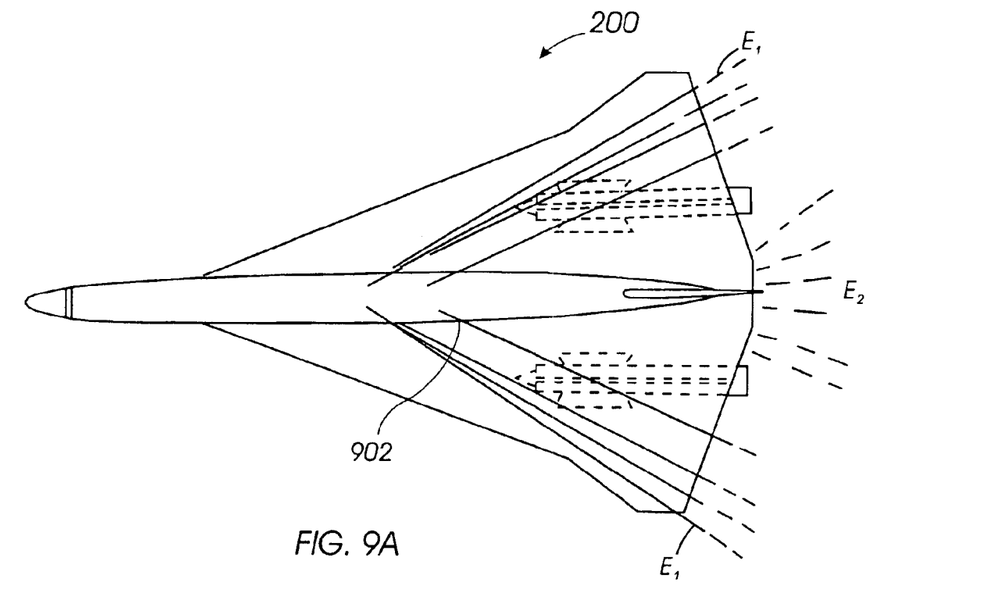
FIGS. 9A and 9B illustrate application of fuselage shaping to tailor a shock expansion to increase lift by reducing pressure above the wings of the aircraft.
Figure 9B:
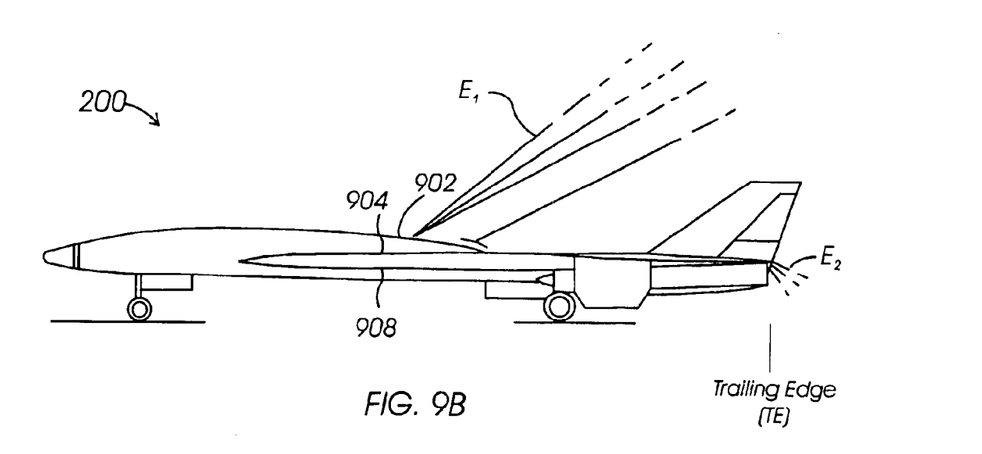

Referring now to FIGS. 9A and 9B, an embodiment of aircraft 200 incorporates further advantages associated with non-planar shock directionality to reduce shock due to lift by reducing the volume of mid-fuselage 902 above wing 904 beyond that needed for wave drag reduction without reducing the volume as much under wing 904. An airflow expansion $E_1$ generated on sloped portion of mid-fuselage 902 lowers the pressure above wing 904 in the area covered by expansion $E_1$. Expansion $E_1$ increases lift without changing the pressure under wing 904, thereby reducing the angle-of-attack required to generate the same lift, and reducing pressure below wing 904.

Figure 8A:
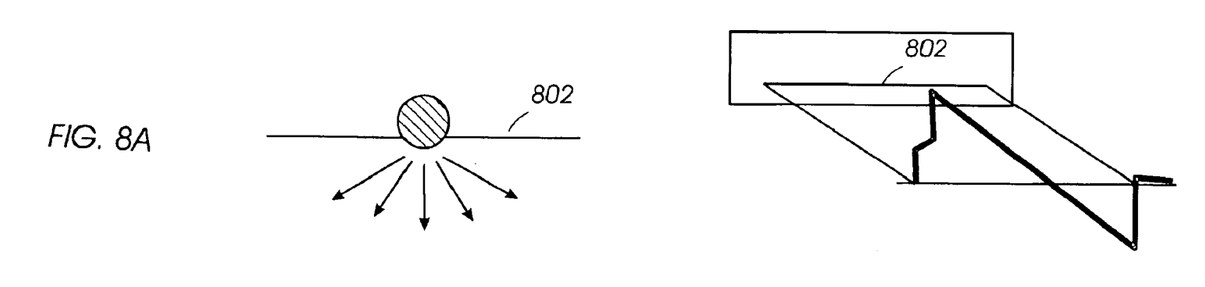
FIGS. 8A and 8B illustrate the dihedral effect on sonic boom shock directionality.
Figure 8B:
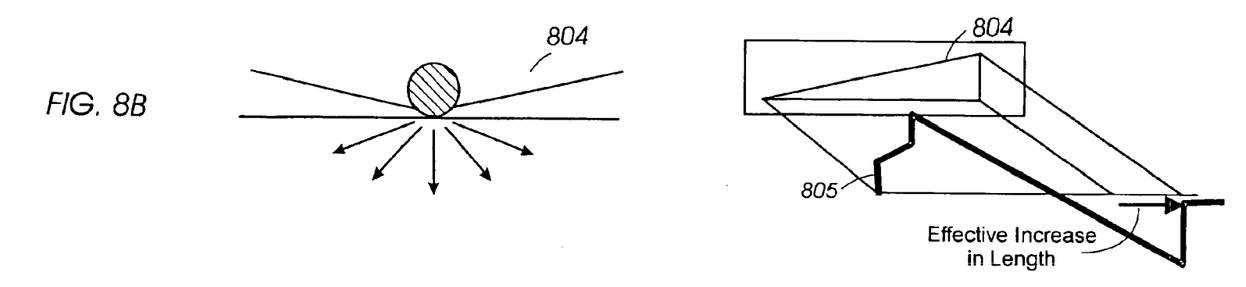
Figure 8C:
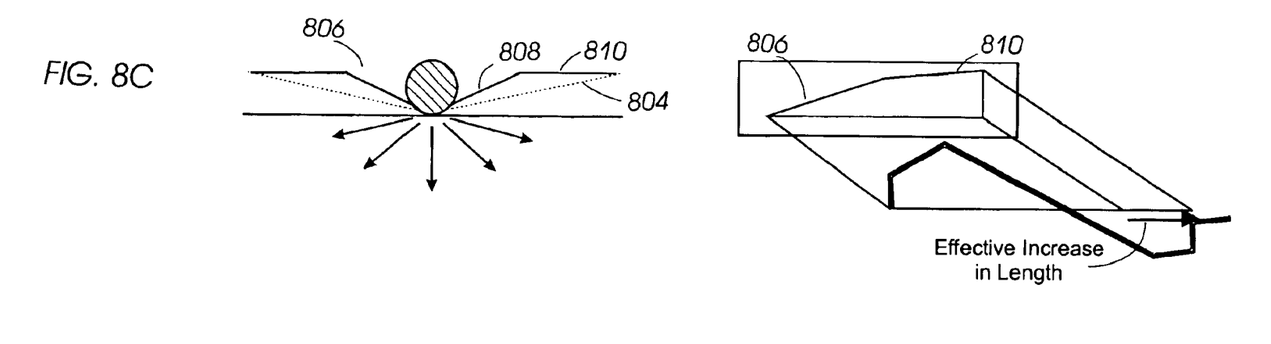
FIG. 8C is a cross-sectional front view of an aircraft with a gull dihedral wing configuration to reduce the strength of sonic boom disturbance generated by the aircraft.

For the second non-planar technique, referring to FIGS. 8A through 8C, wing dihedral can be incorporated in aircraft 200 (FIG. 2C) to make it easier to achieve a sonic boom minimized distribution, to reduce the trim drag associated with meeting a sonic boom minimized distribution, and to improve the loudness reduction possible through sonic boom minimization. FIGS. 8A through 8C each show front and side views of wings 802, 804, 806, respectively. With the highly-swept wings common to supersonic aircraft, increasing the dihedral angle effectively lengthens the pressure distribution signature, as shown in a comparison between FIG. 8A and FIG. 8B. The combination of a sweptback wing and dihedral leads to a wing tip that is higher than it would be otherwise. Because of the angle of the shock waves coming off airplane 200, the higher wing tip stretches out the effective length over which the wing pressure disturbance is distributed under aircraft 200. The shock waves are also compressed above aircraft 200, but those shock waves do not generally propagate to the ground. Whatever distance any part of wing 804 is above the nose of aircraft 200, the lift is that distance times Beta [square root of $(Mach^2-1)$] effectively further behind the nose than its axial distance alone. So carrying lift higher toward the aft end of aircraft 200 is the key to why dihedral can help achieve a minimized sonic boom. Aircraft 200 with sonic boom minimized distributions tend to need to have their lift carried further aft than otherwise desired, so having lift effectively further aft for sonic boom, without being actually further aft, can be especially helpful in balancing a vehicle and avoiding increased trim drag. Diffusing the strength of the shock below aircraft 200, as well as stretching the effective length of aircraft 200, further reduces the sonic boom signature on the ground.

FIG. 8A shows a double front shock and N-wave aft shock for wing 802 with no dihedral. FIG. 8B illustrates the lengthening and corresponding boom strength-reducing effect of dihedral wing 804 on the ground pressure distribution 805 from the corresponding aircraft. Sonic boom disturbance is proportional to length and weight of an aircraft, and the sonic boom disturbance is reduced when the pressure changes are stretched along a greater effective aircraft length. Wing dihedral effectively moves lift due to the wing aft, thereby effectively lengthening the aircraft without affecting the aircraft's center of lift for weight and balance purposes.

Adding dihedral angle to a wing typically has an adverse effect on rolling moment due to sideslip. Designers are therefore limited in the amount of dihedral angle that can be utilized. FIG. 8C shows an embodiment of a refined gull dihedral wing 806 that includes an inboard dihedral 808, and less dihedral or even anhedral on an outboard portion 810. Wing 806 allows a greater dihedral angle to be used than otherwise possible due to the countering effect from the greater moment arm of the outboard portion 810 of wing 806. The reduction in outboard dihedral reduces the tendency to roll while side-slipping, or allows a higher inboard dihedral with the same roll tendency. An anhedraled outboard portion 810 can increase lift and reduce drag in ground effect due to the wing tip being closer to the ground. Outboard portion 810 can also have a different sweep angle than the inboard portion of wing 806. The gull wing 806 places more lift higher than dihedral wing 804 in FIG. 8B, and therefore places more lift aft to meet a sonic boom minimized distribution without it being aft for trim.

Referring to FIGS. 8C and 9A, the combination of gull dihedral wing 806 (FIG. 8C) and reduced volume mid-fuselage 902 can combine their non-planar lift benefits, thereby decreasing the pressure shock strength and stretching the lift aft, easing constraints required to tailor the area/lift distribution on aircraft 200.

Figure 9C:
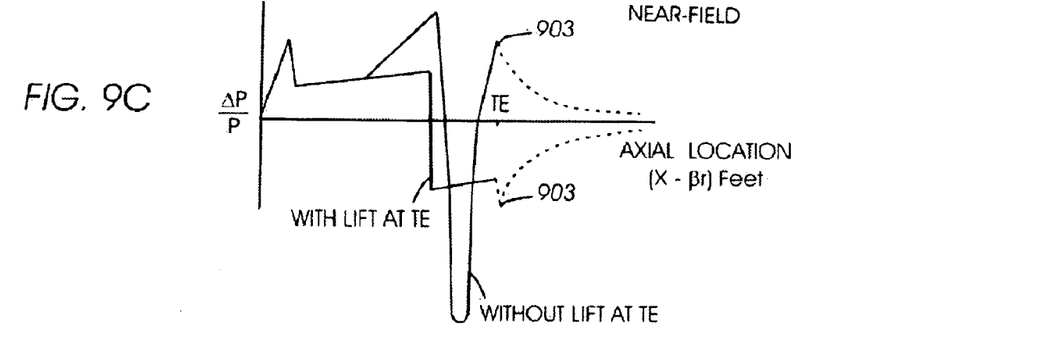
FIG. 9C shows aft near field shock spike generated by a shock wave that occurs off the trailing edge of wing with and without lift at the trailing edge of the wing.
Figure 9D:
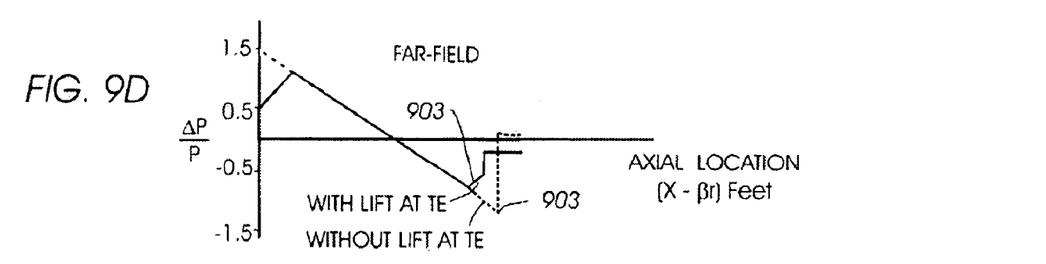
FIG. 9D shows aft far field shock spike generated by a shock wave that occurs off the trailing edge of wing with and without lift at the trailing edge of the wing.
Figure 9E:
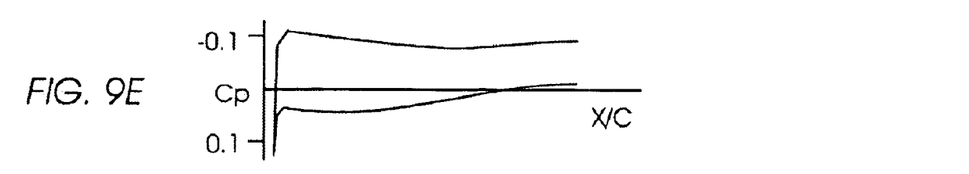
FIG. 9E shows a diagram of pressure coefficients above and below an embodiment of a wing that can be utilized in the aircraft of FIG. 2A.

Regarding the third non-planar techniques, FIGS. 9B, 9C and 9D illustrate the effects of reducing aft shock spike 903 at the trailing edge (TE) of aircraft 200, as shown in the near field pressure distribution of FIG. 9C and the resulting far field pressure distribution shown in FIG. 9D. Aft shock spike 903 is generated by a shock wave that occurs off the trailing edge of wing 904. It is desirable to carry lower pressure above wing 904 relative to below wing 904 to the trailing edge of wing 904, as shown for example in FIG. 9E, to generate an expansion $E_2$ that reduces or even prevents aft shock coalescence behind the trailing edge of wing 904. The far field shock disturbances for aircraft 200 can be reduced, for example, from a range of −1.3 to 0.1 to a range of −0.7 to −0.2 as shown in FIG. 9D.

Figure 9F:
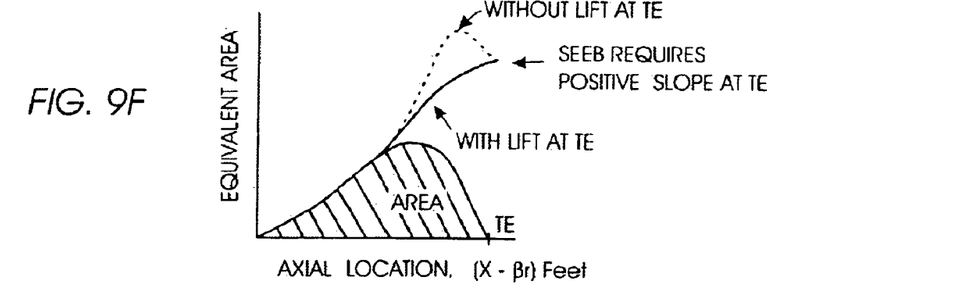
FIG. 9F shows lift curves superimposed on an equivalent area distribution for the aircraft of FIG. 9A with and without trailing edge lift.

In one embodiment of aircraft 200 that implements the third non-planar technique, wing 904 of aircraft 200 extends near the trailing edge of aircraft 200. To prevent aft shock coalescence, FIG. 9F shows equivalent area distributions for aircraft 200 for the pressure distributions in FIGS. 9C and 9D with and without trailing edge lift. Note the substantial reduction of aft shock 903 in the pressure distribution with trailing edge lift. The camber of wing 904 is designed to carry enough lift near the aft end of the vehicle to generate an equivalent area due to lift with a positive slope at the trailing edge of wing 904 as shown in FIG. 9F to generate expansion $E_2$ (FIG. 9B) off the trailing edge of wing 904 as shown in FIG. 9F to generate expansion $E_2$ (FIG. 9B) off the trailing edge of wing 904. Expansion $E_2$ creates the expansion spike needed for George-Seebass minimization from the difference in air pressure between the upper and lower side of wing 904. Moving the center of lift aft also maximizes the effective aircraft length that can be used for area/lift tailoring, which also provides the benefit of reducing the strength of sonic boom shocks.

Another method of generating expansion $E_2$ is to design a portion of the trailing edge of wing 904 in a cambered, slightly downward position to generate expansion $E_2$. Other suitable techniques for generating expansion $E_2$ at the trailing edge of wing 904 can be utilized.

Figure 9G:
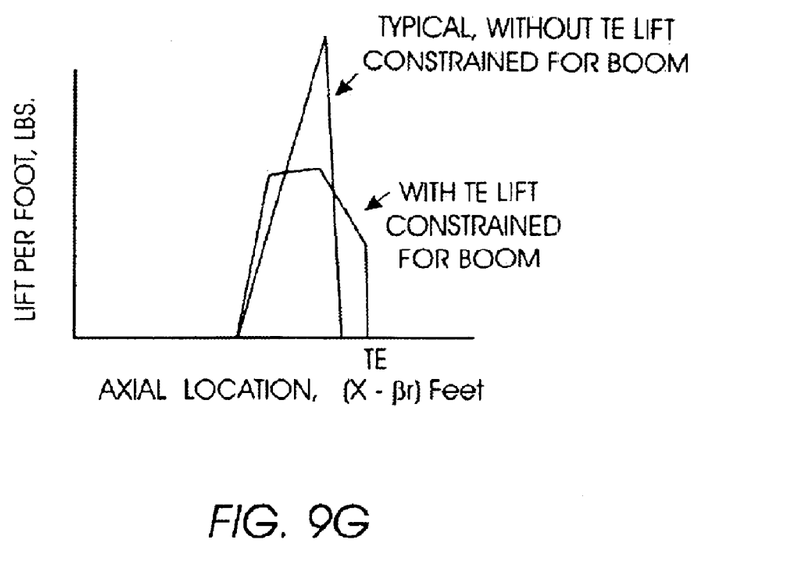
FIG. 9G shows pressure distribution for the aircraft of FIG. 9A with and without trailing edge lift.

FIG. 9G shows the lift per foot in pounds versus axial location on aircraft 200 designed with and without lift carried at the trailing edge of wing 904. When lift is carried to the trailing edge of wing 904, lift per foot rises to a certain level and remains substantially lifting to the trailing edge of wing 904. In contrast, a typical lift per foot rises to a peak and then reduces to zero upon reaching the trailing edge of a wing, thereby generating a positive pressure spike that results in the aforementioned greater aft shock strength at the ground of −1.3 to 0.1 psf.

Figure 10:
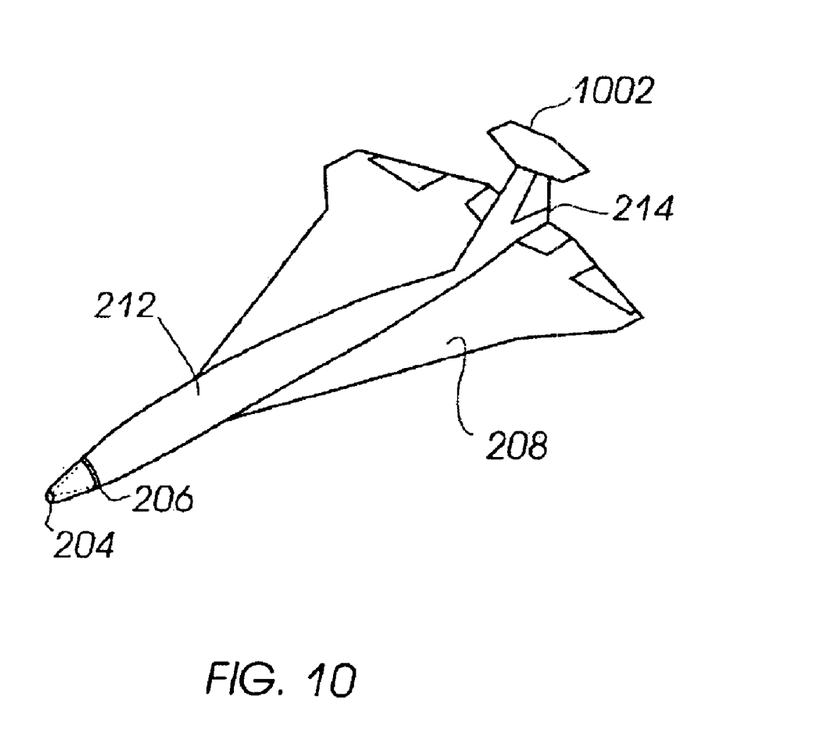
FIG. 10 shows an embodiment of the aircraft of FIG. 9A with a lifting surface on the tail to carry additional lift to the trailing edge of the aircraft.

A method of combining the benefits of placing lift high toward the aft end of an aircraft and getting the aft expansion spike for sonic boom minimization from trailing edge lift can include using a high-mounted, aft, lifting tail 1002, as shown in FIG. 10. As discussed previously for dihedral and gull wings 804, 806 (FIGS. 8B and 8C), tail 1002 increases the effective lifting length and allows the lift to be carried effectively aft for sonic boom minimization while not actually being aft for balance. A sonic boom minimized lift/area distribution can be efficiently achieved by configuring tail 1002 to achieve the lift needed for sonic boom minimization and properly cambering the trailing edge of the tail to produce exactly the expansion spike size needed. In some embodiments, tail 1002 is positioned as high as practical. However, the farther behind wing 208 tail 1002 is placed, the greater the amount of lift tail 1002 needs to carry. Tail 1002 can be placed closely behind or even overlapping the aft end of the wing's effective lift, since tail 1002 is in the wing downwash and may create greater drag for the same amount of lift.

Thus, combining one or more of the foregoing techniques for reducing sonic boom disturbances alleviates constraints in designing an aircraft to minimize rates of change in cross-sectional area. The resulting flexibility provides designers with a wider range of choices for configuring an aircraft to reduce sonic boom disturbance.

Those skilled in the art will appreciate that various adoptions and modifications of embodiments of the invention as described above can be configured without departing from the scope of the claims. Therefore, it is to be understood that within the scope of the appended claims, the invention may be practiced other than as specically described herein.

We claim:

1. A method comprising:
   configuring an aircraft for supersonic flight with a tailored area/lift distribution including a relaxed bluntness nose and a wing configuration that carries lifting force to the trailing edge of the wing to create an expansion at the trailing edge of the wing that reduces aft sonic boom ground shock loudness by at least approximately 15 decibels compared to aircraft that do not include the relaxed bluntness nose and do not carry lifting force to the trailing edge of the wing.

2. The method aircraft of claim 1, further comprising configuring a shock cancellation shroud around an engine nacelle.

3. The method of claim 2, wherein the relaxed bluntness nose further comprises an inlet and a slot, wherein the slot is configured to provide an outlet for airflow through the inlet.

4. The method of claim 1 further comprising configuring a fixed upward reflex on a portion of the upper and lower surfaces of the wing.

5. The method of claim 4, wherein an engine inlet is positioned aft of the upwardly reflexed portion of the wing.

6. The method of claim 1 wherein the combination of said fuselage and wing comprise a flying wing.

7. The method of claim 2 wherein the shock cancellation shroud extends around a portion of the length of the engine nacelle.

8. The method of claim 5 wherein a shock cancellation shroud is positioned behind the engine inlet.

9. The method of claim 1, wherein the volume of the mid-fuselage portion is reduced above the wing to generate an airflow expansion on a sloped portion of the mid-fuselage to lower the pressure above the wing in the area covered by the expansion, thereby reducing the angle-of-attack required to generate the same lift and reducing pressure below the wing.

10. The method of claim 1 further comprising mounting an engine nacelle is below the wing.

11. The method of claim 1 wherein the wing is a gull dihedral wing that includes an outboard wing portion without dihedral.

12. The method of claim 1 wherein the wing is a gull dihedral wing that includes an anhedral outboard wing portion.

13. The method of claim 1, further comprising:
   configuring a high-mounted lifting aft tail to carry lifting force to the trailing edge of the aircraft to create an expansion at the trailing edge of the tail that reduces the aft sonic boom ground shock strength.

14. The method of claim 1, wherein the height of lifting surfaces of the wing is increased toward the aft end of the aircraft to increase the effective length available for sonic boom minimization.

15. The method of claim 1, wherein the relaxed bluntness nose further comprises an inlet and a slot, wherein the slot is configured to provide an outlet for airflow through the inlet.

16. The method of claim 1 further comprising configuring an upward reflex on a portion of the upper and lower surfaces of the wing.

\* \* \* \* \*